("12") United States Patent
Sherony et al.

(10) Patent No.: US 7,613,569 B2
(45) Date of Patent: *Nov. 3, 2009

(54) CRASH PREDICTION NETWORK WITH VISUAL INPUT FOR VEHICLE

(75) Inventors: Rini Sherony, Ypsilanti, MI (US); Risto P. Miikkulainen, Austin, TX (US); Kenneth O. Stanley, Orlando, FL (US); Nathaniel F. Kohl, Austin, TX (US)

(73) Assignees: Toyota Motor Engineering & Manufacturing North America, Inc., Erlanger, KY (US); The Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/458,261

(22) Filed: Jul. 18, 2006

(65) Prior Publication Data

US 2008/0172177 A1      Jul. 17, 2008

Related U.S. Application Data

(60) Provisional application No. 60/700,610, filed on Jul. 19, 2005.

(51) Int. Cl.
G08G 1/16      (2006.01)
G06G 7/78      (2006.01)

(52) U.S. Cl. .................. 701/301; 701/300; 340/435; 340/436; 340/438; 340/439; 340/901; 280/735

(58) Field of Classification Search ............ 701/19, 701/45, 213, 300, 301; 340/425.5, 435, 436, 340/438, 439, 901, 903; 280/734, 735
See application file for complete search history.

(56) References Cited

U.S. PATENT DOCUMENTS

2005/0107954 A1 *   5/2005   Nahla .................... 701/301

* cited by examiner

*Primary Examiner*—Gertrude Arthur Jeanglaud
(74) *Attorney, Agent, or Firm*—Gifford, Krass, Sprinkle, Anderson & Citkowski, P.C.

(57) ABSTRACT

A method for facilitating the avoidance of a vehicle collision with an object includes the following steps: a) providing an environment for generating training examples, b) evolving a good driver using a visual input, c) evolving a crash predictor using a visual input, and d) outputting a warning signal.

20 Claims, 3 Drawing Sheets

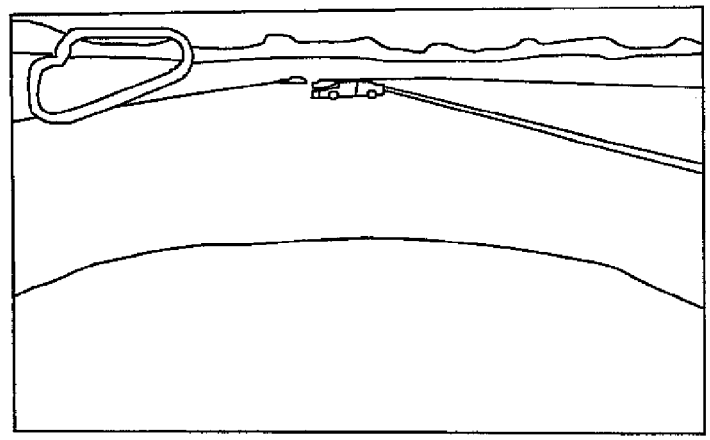
FIG. 3
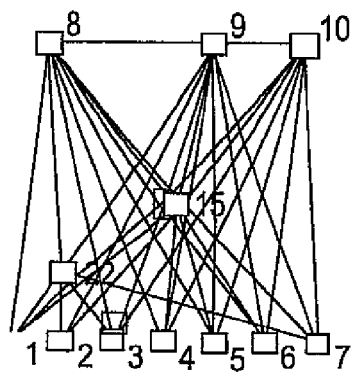
FIG. 4
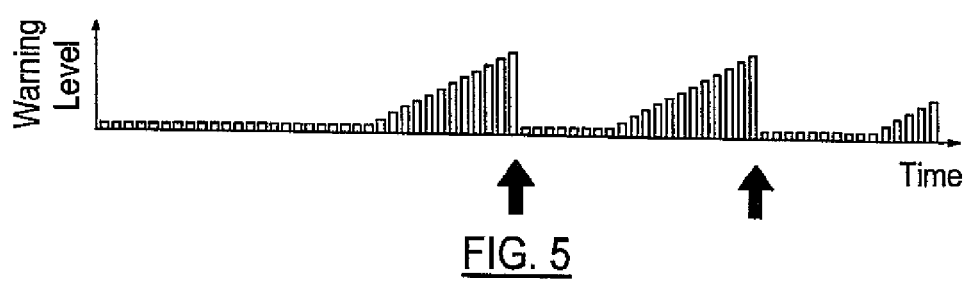
FIG. 5
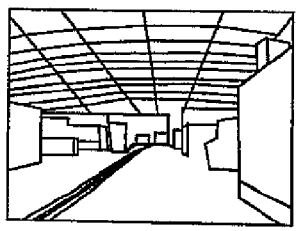 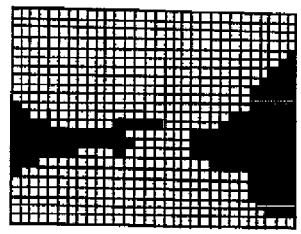 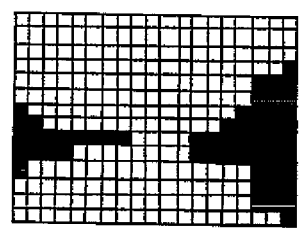
FIG. 6A    FIG. 6B    FIG. 6C

CRASH PREDICTION NETWORK WITH VISUAL INPUT FOR VEHICLE

RELATED APPLICATION

This application claims priority of U.S. Provisional Patent Application Ser. No., 60/700,610 filed Jul. 19, 2005, which is incorporated herein by reference.

FIELD OF THE INVENTION

The invention relates to crash prevention networks and with more particularity to a crash prevention networks having visual inputs.

BACKGROUND OF THE INVENTION

Traditional collision detection and warning is complicated and difficult to achieve with high accuracy. Usually the sensors (primarily radar and vision) need to detect objects, classify them (for vision based sensors) and then provide warning. Usually detection and classification (labeling of objects) can be erroneous in the presence of occlusion and bad weather.

If cars could warn their drivers of an imminent crash without the need for accurately detecting and classifying objects every time that would improve the system and help reduce accidents. One artificial intelligence based approach is that the system learns based on circumstances and previous experience and provides warning without the need for detection and classification each time. One option for building such a warning system is to ask an expert to describe as many dangerous situations as possible and formalize that information in an automated reasoner that reacts to sensors on the car. However, the circumstances leading to a crash are frequently subtle and may vary for different drivers. Moreover, it may not be possible to predict a crash from a static snapshot of the road. The recent history of the car and other objects on the road may have to be taken into account, as well. It is difficult to know how long such a history should be or what it should be tracking. Yet if the car could learn on its own what to track and how long to keep salient events in memory, these challenges could be overcome. In addition, cars could be trained with different drivers under different circumstances, creating more flexible warning systems.

There is therefore a need in the art for a crash detection network to enable a vehicle to learn to predict crashes from visual input.

SUMMARY OF THE INVENTION

A method for facilitating the avoidance of a vehicle collision with an object includes the following steps: a) providing an environment for generating training examples, b) evolving a good driver using a visual input, c) evolving a crash predictor using a visual input, and d) outputting a warning signal.

BRIEF DESCRIPTION OF THE DRAWINGS

FIG. 3 is a visual sensor image;
FIG. 4 is a diagram of a neural network;
FIG. 5 is a diagram of a warning output;
FIG. 6A is an image of the scaled visual input;
FIG. 6B is a scaled visual input of FIG. 6A;
FIG. 6C is a scaled visual input of FIG. 6A.

DETAILED DESCRIPTION OF THE PREFERRED EMBODIMENTS

Figure 1A:
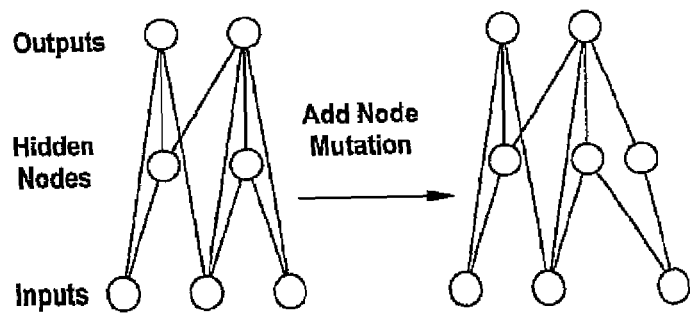
FIG. 1A is a diagram of a NEAT network in an add node mutation.

An artificial intelligence based approach to a crash prediction allows the system to learn based on circumstances and previous experiences and provides warning without the need for accurate detection and classification of an object each time. Such an approach provides a lesser number of computational steps involved, so processing time is less and potentially have less chances of error. Additionally such an approach does not need to have the actual object in the vehicle's path for warning, but warning prediction is done based on the situation/correlation between events, so prediction for time to collision could be longer giving more reaction time to the driver.

The NeuroEvolution of Augmenting Topologies (NEAT)] method for evolving artificial neural networks is used to evolve collision prediction networks. NEAT is an appropriate choice for the learning method because NEAT can develop arbitary recurrent neural networks that keep a variable length of prior history in memory. That means, an expert does not need to decide how long the warning window should be or what it should tale into account, because the recurrent topology can evolve to make this determination on its own. Because NEAT matches the complexity of the neural network to the complexity of the task, it can find the right level of representation for warning under different conditions. If NEAT is to evolve crash predicting networks, it must be trained by observing driving behavior. In reality it would be hard to generate the hundreds or thousands of examples necessary to train a warning network. Conveniently, NEAT can evolve the drivers in simulation before it evolves warning networks.

NeuroEvolution (NE) is a combination of neural networks and genetic algorithms where genetic algorithm is used to train artificial neural networks. NE searches for neural networks that optimize some performance measure. NE can search for virtually any kind of neural network whether it is simple feedforward, recurrent, or even adaptive networks. The chromosomes in NE can represent any parameter of neural networks, from the connection weights to the topology to the activation functions.

While some NE methods evolve only the connection weights of the network, Topology and Weight Evolving Neural Networks (TWEANNs) evolve both weights and network topologies. Fixed-topology methods require a human to decide the right topology for a problem. In contrast, TWEANNs can discover the right topology on their own. In addition, topology evolution can be used to increase efficiency by keeping networks as small as possible, which is a strategy employed by NEAT. Therefore, TWEANNs are an important class of NE methods and they face several specific challenges and difficulties that fixed-topology NE methods do not. Searching in too large a space, i.e. a space of highly complex networks would be intractable, while searching in too simple a space would limit solution quality. Moreover, it is not known how many or where recurrent connections should exist in the network to allow it to react to past states.

Therefore, the NeuroEvolution of Augmenting Topologies (NEAT) method, which automatically evolves network topology to fit the complexity of the problem, is appropriate for these tasks. NEAT combines the usual search for the appropriate network weights with complexification of the network structure. This approach is highly effective: NEAT outperforms other neuroevolution (NE) methods in bench-mark tasks. In addition, because NEAT starts with simple networks and expands the search space only when beneficial, it is able to find significantly more complex controllers than fixed-topology evolution. These properties make NEAT an attractive method for evolving neural networks in complex tasks.

Figure 1B:
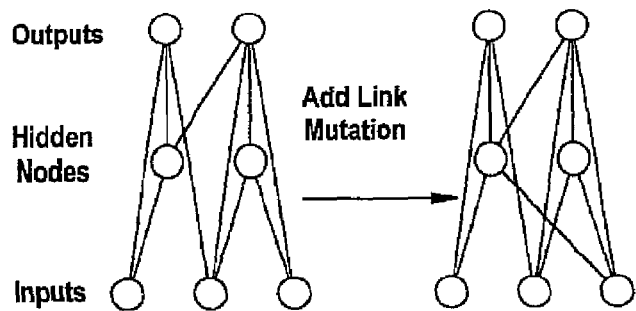
FIG. 1B is a diagram of a NEAT network in an add link mutation.

NEAT is based on three key ideas. The first being, evolving network structure requires a flexible genetic encoding. Each genome in NEAT includes a list of connection genes, each of which refers to two node genes being connected, Each connection gene specifies the in-node, the out-node, the weight of the connection, whether or not the connection gene is expressed (an enable bit), and an innovation number, which allows finding corresponding genes during crossover. Mutation can change both connection weights and network structures, as shown in FIG. 1. Connection weights mutate as in any NE system, with each connection either perturbed or not. Structural mutations, which allow complexity to increase, either add a new connection or a new node to the network. Through mutation, genomes of varying sizes are created, sometimes with completely different connections specified at the same positions. Each unique gene in the population is assigned a unique innovation number, and the numbers are inherited during crossover. Innovation numbers allow NEAT to perform crossover without the need for expensive topological analysis. Genomes of different organizations and sizes stay compatible throughout evolution, and the problem of matching different topologies is essentially avoided.

Second, NEAT speciates the population, so that individuals compete primarily within their own niches instead of within the whole population. This way, topological innovations are protected and have time to optimize their structure before they have to compete with other niches in the population. The reproduction mechanism for NEAT is fitness sharing, where organisms in the same species must share the fitness of their niche, preventing any one species from taking over the population.

Third, unlike other systems that evolve network topologies and weights, NEAT begins with a uniform population of simple networks with no hidden nodes. New structure is introduced incrementally as structural mutations occur, and only those structures survive that are found to be useful through fitness evaluations. This way, NEAT searches through a minimal number of weight dimensions and finds the appropriate complexity level for the problem.

In the method of the present invention, NEAT is used to train bolt drivers and crash predictors.

Figure 2A:
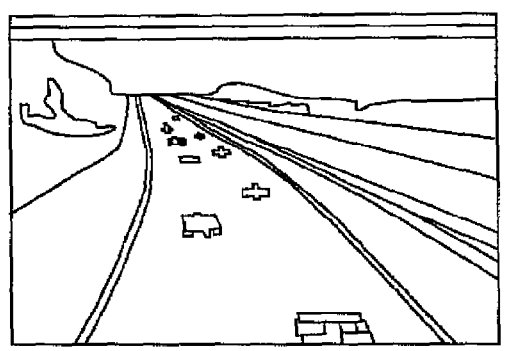
FIG. 2A is a diagram of a RARS simulator output.
Figure 2B:
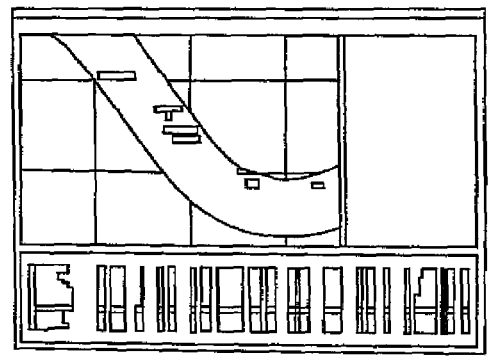
FIG. 2B is a diagram of a RARS simulator output.

Since learning requires experience, it is necessary for NEAT to gain experience through driving and predicting crashes. While crashing cars in the real world would be dangerous and expensive, a reasonable alternative used is to evaluate NEAT in simulation. RARS, a public domain racing simulator designed for artificial intelligence testing and real-time control, was chosen for this purpose in an original feasibility study. Vehicle dynamics are accurately simulated, including skidding and traction. Multiple automobiles controlled by different automated drivers can race at the same time. The software automatically provides information like the distance between the driver and other vehicles, and the direction of the road. It also automatically provides different first-person views of the world in three dimensions that can be used to simulate visual input from a camera mounted in the automobile, as shown in FIGS. 2A and 2B. RARS driving data was converted into visual sensor representation that was provided to the neural network to sense road edges, as shown in FIG. 3. The visual sensors give the car an indication of its position and heading relative to the sides of the road and also of the curvature of the road. RARS provides a virtual gas pedal, break, and steering. Simulated visual sensors may be used to indicate the edges of the road and indicate the distance to the intersections, giving the car a sense of its position and the road's curvature. RARS' original data structures were converted into visual sensor data so that NEAT could train neural networks with a realistic egocentric input.

The method of the present invention provides for the evolution of a good driver using the NEAT method. A training environment is provided, as well as an initial population of networks. The visual input is generated and fed to the neural network, A fitness is then calculated. The above steps may be repeated a plurality of times for each network. Next a determination is made to discard or reproduce a network. A new population is formed from the reproduction or discarding of the networks. An example of an evolution of open road drivers with visual sensors was performed in experimentation of the method of the present invention. The visual sensor data may come from the RARS training or from visual sensors, such as a CMOS or CCD sensor. During evolution, each neural network in the population was evaluated over three trials and each trial tested 1000 simulated time steps to go around the track in the simulator once. The network's fitness was the average score over three trials, The score for a single trial is calculated in proportion to distance traveled and damage incurred that is proportional to the time spent off the track. For example, the fitness may be calculated by the formula, $$S = 2d - b$$

Where b is the damage incurred over time spent off the track, and d is the distance traveled. The fitness function penalizes crashing and rewards speed. It should be realized that many other formulas may be used to calculate a fitness using the distance traveled and damage.

In order to evolve warning networks we need drivers that get into dangerous situations. One can either evolve the drivers in simulation as described above and input the data or use human drivers to drive the vehicles in RARS using a joystick. In one application of the method of the present invention we generated open road drivers in simulation that drove perfectly in an open road and then the weights of the associated networks were slightly changed to generate many imperfections/variations in driving behavior or different drivers. In simulation the weights of the best driver were perturbed using uniform random noise between −0.4 and 0.4 to create many drivers that could still navigate in the track, but occasionally make wrong decisions and then crash, making them good training drivers to warn of impending crashes.

The crash predictor outputs a prediction about whether a crash is going to happen. This prediction must be based on what the driver has been doing over some time leading up to the present. If the predictor has a good model of the driver's behavior, it can make realistic predictions about what the driver is likely to do in potentially dangerous situations. NEAT is automatically making this determination by evolving the recurrent networks. One advantage of neuroevolution over supervised methods is that because neuroevolution does not rely on training targets, networks can be trained to bias their errors in the least costly direction. For example, losing a life is more costly than a false alarm, so networks can be rewarded or penalized accordingly. In supervised learning, the relative importance of different kinds of errors is difficult to incorporate into training.

The crash predictor of the method of the present invention is evolved by providing the same visual inputs as the drivers described above. As outlined above there is provided a training environment and an initial population of networks. Instead of outputting driving control, the crash predictor outputs a prediction about whether a crash is going to happen. The input may be from the RARS training or from visual sensors, such as a CMOS or CCD sensor. The visual input may be scaled from the original number of pixels of the sensor to a smaller number of pixels to facilitate processing by the neural network. The scaled sensor data may be assigned numerical values from zero to one for each pixel. The sensor data is an array of pixels in either a color or grayscale format. The scaled sensor data may then be fed to the neural network. The output of the neural network is an indication if a crash is going to happen or if a dangerous condition exists, The output of the neural network is targeted to indicate if a crash or dangerous condition exists. The targeted outputs may then be compared to the output of the neural network for the same set of visual data to determine if the network is discarded or reproduced. The best networks may be used as a crash predictor to determine when a warning should be issued.

The visual sensor data may be inputted both offline and online. For online training, visual input data is supplied to the neural network at the same time as it is generated in RARS and the output is targeted for a danger or warning level. For offline training, the visual input data is generated separately in RARS and saved in a file or database and then fed outside RARS to the neural network. The output is then targeted for a danger or warning level. In addition to the online training using the RARS simulator the method of the present invention may utilize offline training using actual drivers within the RARS system. Both online and offline training is sufficient to evolve accurate networks for the method of the present invention. The speed and accuracy of evolution varies between offline and online training. The speed is potentially faster in offline training but there is less variation in the training results in comparison to online line training. Similarly, the online training may have a greater variation in the training results leading to an increased accuracy, but with a slower training speed.

The array of pixels from the visual sensor is generated a plurality of times for a trial. Each trial may include numerous different arrays of pixels. The number of arrays of pixels for a trial should be sufficient to allow the neural network to evolve to provide a reliable warning capability. In one aspect, the trial may include at least 9000 different arrays of pixels. It should be realized that other numbers of arrays of pixels may be utilized.

By targeting the dangerous conditions, NEAT was able to evolve networks that could provide a warning signal and evolution could determine on its own how far back in the past relevant information should be saved in recurrent connections, FIG. 4 shows such a successful warning network. This small network was able to make accurate predictions about crashing with minimal topology. The recurrent loop on node 15 and the connections between outputs give the network a rudimentary memory for events in the past. This memory allows it to predict crashes after events like skidding that can only be detected by considering the recent past positions of the car.

In addition to the open road driver described above, the method of the present invention may be used to evolve drivers and warning networks over many different driving conditions. For example, a stereo camera was attached to a robot to perform testing to avoid obstacles simulating the action of a driver in avoiding obstacles. The stereo camera used in the robotic testing saved two grayscale 1024×768 images per frame, where the two images had a horizontal disparity of 120 mm. Each of the frames of data was manually assigned a target warning level, as shown in FIG. 5. The 40 frames of data preceding a "danger scenario" (e.g. crossing the dividing line into oncoming traffic, or coming sufficiently close to an obstacle in the path) were labeled with increasing danger levels, such that the last frame before the danger scenario would have the highest danger level, whereas the frame 40 frames previous would be assigned the lowest danger level. All frames before these 40 frames were assigned the lowest danger level. As detailed in FIG. 5, the arrows denote danger scenarios. The warning level stays at a low level until 40 frames before a danger scenario. It then increases in a linear manner until the danger scenario occurs.

The goal of the learning system was to create a warning network that would assign the same warning levels to frames of data that humans would. For N frames of data, the average squared difference (mean squared error, or MSE) between the ideal warning and human warning for each frame would be zero. Since the robot was capturing data at 10 frames per second, a goal of warning 40 frames in advance was similar to warning 4 seconds in advance. It should be realized that other numbers of frames may be used in the method of the invention.

For the purposes of training and evaluating warning networks, the total data corpus was divided into training (90%) and testing (10%) data sets. Warning networks were trained on the training data sets for 100 generations. Performance was measured by how well the best networks from each generation performed on the test data sets.

Because of the large images sizes produced by the camera, feeding all 786,432 pixels of a full-size 1024×768 image to a warning network could make learning a decent warning policy quite difficult. To make the learning process easier, the image size was decreased substantially to two different lower sizes. In order to convert a frame of data (a pair of images from the stereo camera) into values for the warning network, two preprocessing steps were performed. First, the image was down-sampled from 1024×768 to either 30×21 or 20×14, as shown in FIG. 6. Then, the pixels of this smaller grayscale image were converted into numbers between 0 and 1, where 0 represented black and 1 represented white.

Figure 7A:
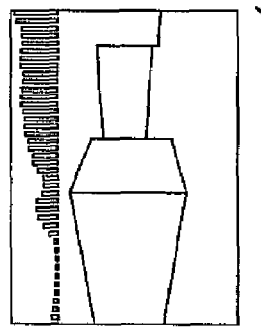
FIG. 7A is a visual image and warning output for a robot test vehicle before a danger scenario.
Figure 7A:
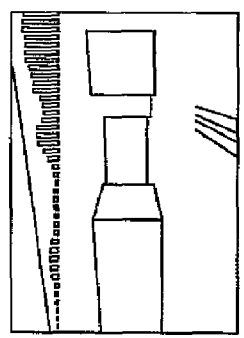
Figure 7A:
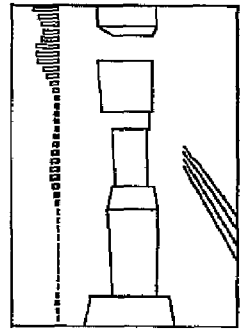
Figure 7A:
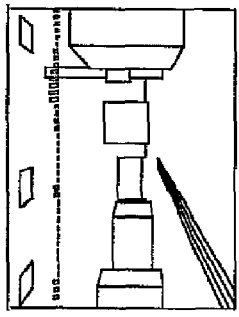
Figure 7B:
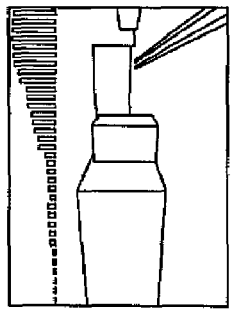
FIG. 7B is a visual image and warning output for a robot test vehicle before a danger scenario.
Figure 7B:
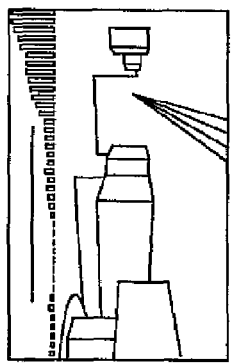
Figure 7B:
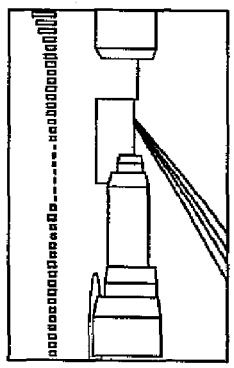
Figure 7B:
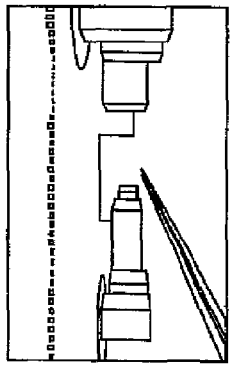
Figure 7C:
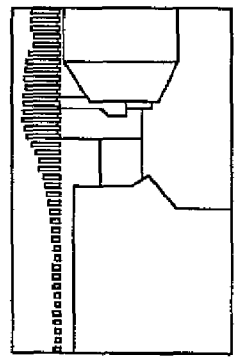
FIG. 7C is a visual image and warning output for a robot test vehicle before a danger scenario.
Figure 7C:
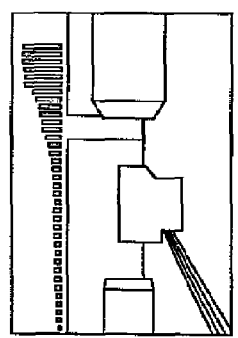
Figure 7C:
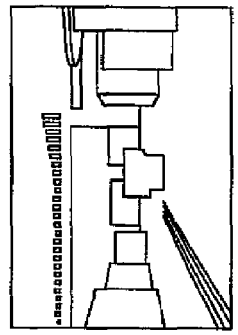
Figure 7C:
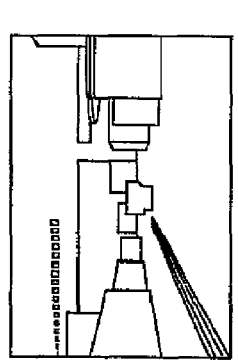

Referring to FIGS. 7A-C, there are shown examples of warnings generated by the visual data trained network (A, B, C) for three different situations where a robot is driven in an indoor office environment. Four frames of data are shown for each example, representing (from left to right) 3, 2, 1 and 0 seconds before the danger scenario. As can be seen in the figure, the neural network generated a warning signal at a time prior to a collision, based on the visual data inputted to the neural network.

The invention has been described in an illustrative manner. It is to be understood that the terminology that has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A method for facilitating the avoidance of a vehicle collision with an object comprising the steps of:
 a) providing a training environment;
 b) evolving a good driver using a visual input, wherein the step of evolving a good driver includes the steps of:
 e) providing an initial population of networks;
 f) generating visual sensory signals;
 h) inputting the visual sensory signals to-the a neural network;
 h) calculating a fitness value;
 i) repeating steps f-h a plurality of times for each neural network;
 j) determining which neural network to discard and which neural network to reproduce;
 k) forming a new population by discarding and reproducing;
 l) repeating steps i-k a plurality of times;
 c) evolving a crash predictor using a visual input;
 d) outputting a warning signal.

2. The method of claim 1 wherein the fitness is calculated in proportion to a distance traveled and a damage incurred over time spent off a road.

3. The method of claim 2 wherein the sensory signals are visual pixels.

4. The method of claim 3 including the step of scaling the visual sensory signals following the step of generating the visual sensory signals.

5. The method of claim 3 wherein the step of scaling the visual sensory signals includes assigning each pixel a numerical value.

6. The method of claim 5 wherein the numerical value is from zero to one.

7. The method of claim 3 wherein the visual pixels are converted from simulated driving data.

8. The method of claim 3 wherein the visual pixels are generated from a CMOS or CCD sensor.

9. The method of claim 1 wherein the visual sensory signal is inputted online.

10. The method of claim 1 wherein the visual sensory signal is inputted offline.

11. A method for facilitating the avoidance of a vehicle collision with an object comprising the steps of:
 a) providing a training environment;
 b) evolving a good driver using a visual input;
 c) evolving a crash predictor using a visual input wherein the step of evolving a crash predictor includes the steps of
 m) providing an initial population of networks;
 n) generating visual sensory signals;
 o) inputting the visual sensory signals to the a neural network;
 p) forming targeted outputs based on when a crash occurs;
 q) calculating a fitness value;
 r) repeating steps m-q a plurality of times for each neural network;
 s) determining which neural network to discard and which neural network to reproduce;
 t) forming a new population by discarding and reproducing;
 u) repeating steps r-t a plurality of times; and
 d) outputting a warning signal.

12. The method of claim 11 wherein the fitness is calculated in proportion to a difference in the targeted output and the actual output of the network.

13. The method of claim 11 wherein the sensory signals are visual pixels.

14. The method of claim 11 including the step of scaling the visual sensory signals following the step of generating the visual sensory signals.

15. The method of claim 14 wherein the step of scaling the visual sensory signals includes assigning each pixel a numerical value.

16. The method of claim 15 wherein the numerical value is from zero to one.

17. The method of claim 13 wherein the visual pixels are converted from simulated driving data.

18. The method of claim 13 wherein the visual pixels are generated from a CMOS or CCD sensor.

19. The method of claim 11 wherein the visual sensory signal is inputted online.

20. The method of claim 11 wherein the visual sensory signal is inputted offline.

* * * * *

UNITED STATES PATENT AND TRADEMARK OFFICE
CERTIFICATE OF CORRECTION

PATENT NO. : 7,613,569 B2  Page 1 of 1
APPLICATION NO. : 11/458261
DATED : November 3, 2009
INVENTOR(S) : Rini Sherony et al.

It is certified that error appears in the above-identified patent and that said Letters Patent is hereby corrected as shown below:

Column 2, line 31 replace "arbitary" with --arbitrary--

Column 2, line 34 replace "tale" with --take--

Column 3, line 55 replace "bolt" with --both--

Signed and Sealed this

Twenty-sixth Day of January, 2010

David J. Kappos
*Director of the United States Patent and Trademark Office*